United States Patent
Yoon et al.

(10) Patent No.: US 11,411,413 B2
(45) Date of Patent: Aug. 9, 2022

(54) BATTERY PACK CHARGING SYSTEM HAVING STRUCTURE CAPABLE OF PREVENTING OVERCHARGING, AND VEHICLE COMPRISING SAME

(71) Applicant: LG CHEM, LTD., Seoul (KR)

(72) Inventors: Seo-Young Yoon, Daejeon (KR); Sol-Nip Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 30 days.

(21) Appl. No.: 17/047,172

(22) PCT Filed: Oct. 23, 2019

(86) PCT No.: PCT/KR2019/014007
§ 371 (c)(1),
(2) Date: Oct. 13, 2020

(87) PCT Pub. No.: WO2020/101207
PCT Pub. Date: May 22, 2020

(65) Prior Publication Data
US 2021/0152006 A1    May 20, 2021

(30) Foreign Application Priority Data
Nov. 12, 2018   (KR) .................. 10-2018-0138450

(51) Int. Cl.
*H02J 7/00* (2006.01)
*B60L 53/00* (2019.01)
(Continued)

(52) U.S. Cl.
CPC ........ *H02J 7/00302* (2020.01); *B32B 15/043* (2013.01); *B32B 15/08* (2013.01);
(Continued)

(58) Field of Classification Search
CPC ........ H02J 7/00302; H02J 7/0013; H02J 7/14; B32B 15/043; B32B 15/08;
(Continued)

(56) References Cited

U.S. PATENT DOCUMENTS 6,341,405 B1   1/2002   Uchida
7,683,585 B1 * 3/2010   Johnson ............... H02J 7/1423
                                                      320/159
(Continued)

FOREIGN PATENT DOCUMENTS

CN          104779661 A  *  7/2015   ........... H01M 10/42
DE   10 2016 222 142 A1     5/2018
(Continued)

OTHER PUBLICATIONS

International Search Report for PCT/KR2019/014007 dated Feb. 20, 2020.
(Continued)

*Primary Examiner* — M Baye Diao
(74) *Attorney, Agent, or Firm* — Birch, Stewart, Kolasch & Birch, LLP

(57) ABSTRACT

A battery pack charging system includes a battery pack comprising a plurality of battery cells; a charging device connected to both electrodes of the battery pack to supply a charging current to the battery pack; a switch connected between the battery pack and the charging device to allow or block a flow of the charging current; and a current blocking member mechanically connected to the switch and configured to turn off the switch by causing a bending deformation when a potential difference formed between both electrodes of the battery pack is equal to or greater than a reference value.

18 Claims, 3 Drawing Sheets

(51) Int. Cl.
*B60L 50/61* (2019.01)
*B60L 58/18* (2019.01)
*B60L 50/64* (2019.01)
*B60L 58/15* (2019.01)
*H01M 50/249* (2021.01)
*H01M 50/574* (2021.01)
*H01M 50/211* (2021.01)
*B32B 15/04* (2006.01)
*B32B 15/08* (2006.01)
*H01M 10/46* (2006.01)
*H02J 7/14* (2006.01)

(52) U.S. Cl.
CPC ............ *B60L 50/61* (2019.02); *B60L 50/64* (2019.02); *B60L 53/00* (2019.02); *B60L 58/15* (2019.02); *B60L 58/18* (2019.02); *H01M 10/46* (2013.01); *H01M 50/211* (2021.01); *H01M 50/249* (2021.01); *H01M 50/574* (2021.01); *H02J 7/0013* (2013.01); *H02J 7/14* (2013.01); *B32B 2250/03* (2013.01); *B32B 2307/202* (2013.01); *B32B 2457/10* (2013.01); *H01M 2220/20* (2013.01)

(58) Field of Classification Search
CPC .......... B32B 2250/03; B32B 2307/202; B32B 2457/10; B32B 15/085; B32B 2250/40; B32B 2307/206; B32B 15/20; B32B 2605/08; B32B 27/28; B32B 27/286; B32B 27/322; B32B 37/06; B60L 50/61; B60L 50/64; B60L 53/00; B60L 58/15; B60L 58/18; B60L 2240/545; B60L 3/04; B60L 50/10; B60L 53/20; B60L 58/14; B60L 3/0046; B60L 58/10; H01M 10/46; H01M 50/211; H01M 50/249; H01M 50/574; H01M 2220/20; F03G 7/0121; H01H 57/00; Y02E 60/10; Y02T 90/14; Y02T 10/62; Y02T 10/70; Y02T 10/7072
USPC ....................................... 320/112
See application file for complete search history.

(56) References Cited

U.S. PATENT DOCUMENTS

| | | | |
|---|---|---|---|
| 9,570,924 B2 * | 2/2017 | Endo | .................. H02J 7/00302 |
| 2002/0050881 A1 | 5/2002 | Hyman et al. | |
| 2003/0151868 A1 | 8/2003 | Inae et al. | |
| 2008/0170936 A1 | 7/2008 | Den Toonder et al. | |
| 2010/0295653 A1 | 11/2010 | Pinto et al. | |
| 2011/0241490 A1 | 10/2011 | Anand et al. | |
| 2014/0127549 A1 | 5/2014 | Roh et al. | |
| 2015/0130424 A1 | 5/2015 | Kam et al. | |
| 2017/0047569 A1 | 2/2017 | Saka et al. | |
| 2017/0179853 A1 | 6/2017 | Choi et al. | |
| 2018/0041052 A1 | 2/2018 | Nakamoto et al. | |
| 2018/0198053 A1 | 7/2018 | Doyle et al. | |
| 2019/0356138 A1 * | 11/2019 | Seol | ........................ H02J 7/008 |

FOREIGN PATENT DOCUMENTS

| | | | | |
|---|---|---|---|---|
| JP | 52-134939 U | | 10/1977 | |
| JP | 2000-207965 A | | 7/2000 | |
| JP | 2002-95157 A | | 3/2002 | |
| JP | 2003-234055 A | | 8/2003 | |
| JP | 2004133568 A | * | 4/2004 | ............ H01H 61/00 |
| JP | 2008-535669 A | | 9/2008 | |
| JP | 2014-523627 A | | 9/2014 | |
| JP | 2015-207419 A | | 11/2015 | |
| JP | 2018-23257 A | | 2/2018 | |
| JP | 2018-37327 A | | 3/2018 | |
| KR | 20070075007 A | * | 7/2007 | ............ H01M 10/52 |
| KR | 20080025429 A | * | 3/2008 | ............ H01M 10/46 |
| KR | 10-2010-0101948 A | | 9/2010 | |
| KR | 10-2015-0056733 A | | 5/2015 | |
| KR | 10-2015-0115402 A | | 10/2015 | |
| KR | 10-2016-0006412 A | | 1/2016 | |
| KR | 10-2016-0051510 A | | 5/2016 | |
| KR | 10-2018-0008976 A | | 1/2018 | |
| KR | 10-2018-0100908 A | | 9/2018 | |
| KR | 20200007101 A | * | 1/2020 | ............ H02J 7/342 |
| KR | 102080017 B1 | * | 2/2020 | .......... H01M 50/116 |
| WO | WO-2013114459 A1 | * | 8/2013 | ........ G01R 31/3648 |
| WO | WO 2014/202687 A1 | | 12/2014 | |
| WO | WO 2018/065232 A1 | | 4/2018 | |

OTHER PUBLICATIONS

Extended European Search Report for European Application No. 19884112.4, dated Jul. 29, 2021.

* cited by examiner

BATTERY PACK CHARGING SYSTEM HAVING STRUCTURE CAPABLE OF PREVENTING OVERCHARGING, AND VEHICLE COMPRISING SAME

TECHNICAL FIELD

The present disclosure relates to a battery pack charging system having a structure capable of preventing overcharging and a vehicle including the battery pack charging system, and more particularly to, a battery pack charging system including a current blocking member capable of blocking a current flowing in a circuit by changing a shape of the current blocking member according to a potential difference applied between both surfaces and operating a switch connected between a battery pack and a charging device and a vehicle including the battery pack charging system.

The present application claims priority to Korean Patent Application No. 10-2018-0138450 filed on Nov. 12, 2018 in the Republic of Korea, the disclosures of which are incorporated herein by reference.

BACKGROUND ART

Fuse devices which are currently used in secondary batteries include a positive temperature coefficient (PTC) thermistor, a thermal cut-out (TCO), a thermal fuse, etc. However, in the case of the thermal fuse, there is a disadvantage of one-time use, and although the PTC thermistor or the TCO is repeatedly usable, there is a disadvantage that the resistance thereof increases as the operation is repeated, which increases the overall resistance on the circuit.

In addition, all of the above-mentioned devices operate by heat generated by an overcurrent. That is, the above-mentioned devices correspond to devices that operate to block the flow of a current when the overcurrent is generated on a circuit current path due to overcharging, etc., and thus the temperature increases.

Therefore, in the case of the above-mentioned devices, it is possible to block the overcurrent by operating after a situation where safety may be threatened due to the heat, and it is impossible to block the overcurrent immediately when a cause for increasing the temperature occurs.

In addition, in the case of the above-mentioned devices, since the devices operate simply according to the temperature, it is difficult to use the devices in a secondary battery exhibiting a high output such as a battery pack used in a vehicle. In other words, in the case of a vehicle battery pack, a high c-rate is required, which also accordingly requires a large amount of heat. There is a problem in that the devices such as the PTC thermistor, the TCO, and the thermal fuse operate too early when placed in such a high temperature environment.

Therefore, there is a need for a secondary battery to which a device that is reusable and is usable even in an environment where a high current flows, and is capable of previously blocking the current when an event that may cause such a temperature rise occurs before the temperature rises is applied.

DISCLOSURE

Technical Problem

The present disclosure is designed to solve the problems of the related art, and therefore the present disclosure is directed to providing a battery pack charging system having a structure in which a current blocking member capable of previously blocking current before the temperature of the battery pack rises by heat generated due to overcharging of the battery pack, etc. is installed.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack charging system including a battery pack including a plurality of battery cells and a pair of electrodes; a charging device connected to both electrodes of the battery pack to supply a charging current to the battery pack; a switch connected between the battery pack and the charging device to allow or block a flow of the charging current; and a current blocking member mechanically connected to the switch and configured to turn off the switch by causing a bending deformation when a potential difference formed between both electrodes of the battery pack is equal to or greater than a reference value.

Each of the plurality of battery cells may be a pouch type battery cell.

The charging device may be an alternator installed in a vehicle.

A first end of the current blocking member in a longitudinal direction may be directly or indirectly fixed to the battery pack or a ground, and a second end of the current blocking member may be a free end having a position which is changeable by the bending deformation.

The current blocking member may include an electro active polymer (EAP) layer; a first metal layer formed on one side of the EAP layer; and a second metal layer formed on the other side of the EAP layer.

The EAP layer may include at least one polymer electrolyte selected from Nafion, polypyrrole, polyaniline and polythiophene.

The first metal layer and the second metal layer may include at least one metal selected from the group comprising platinum, silver and copper.

The first metal layer may be electrically connected to a negative electrode of the battery pack, and the second metal layer may be electrically connected to a positive electrode of the battery pack.

The switch may be connected between the negative electrode of the battery pack and the charging device.

The first metal layer may be mechanically/electrically connected to the switch by a connecting rod formed of a conductive material.

The first metal layer may be mechanically connected to the switch by a connecting rod and is electrically connected to the negative electrode of the battery pack by a negative electrode connecting rod.

The connecting rod may be hinged to each of the switch and the first metal layer.

In another aspect of the present disclosure, there is provided a vehicle including the battery pack charging system as described above.

Advantageous Effects

In the use of a battery pack, before the temperature of a secondary battery rises by heat generated due to an overcurrent, a current may be blocked by previously detecting a potential difference equal to or greater than a reference value that causes occurrence of the overcurrent, thereby securing safety in the use of the battery pack.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, referring to FIGS. 1 to 5, the overall configuration of a battery pack charging system according to an embodiment of the present disclosure will be described.

Figure 1:
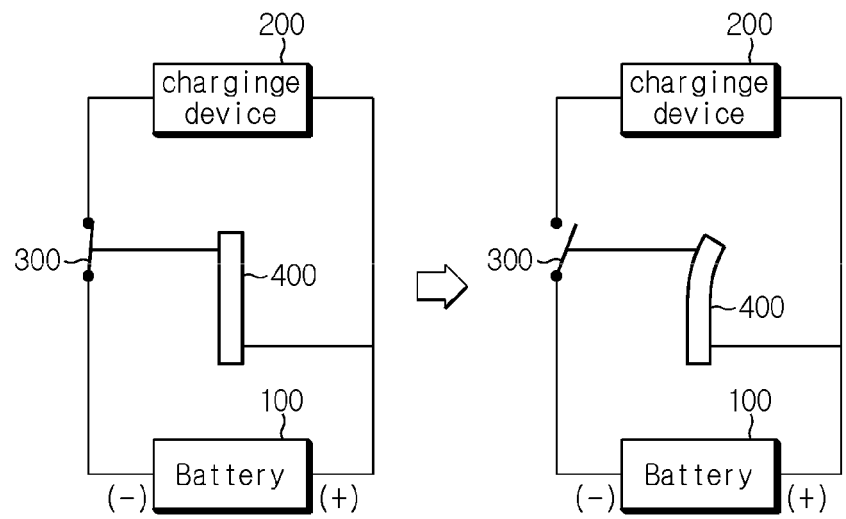
FIG. 1 is a diagram showing a battery pack charging system according to an embodiment of the present disclosure.
Figure 2:
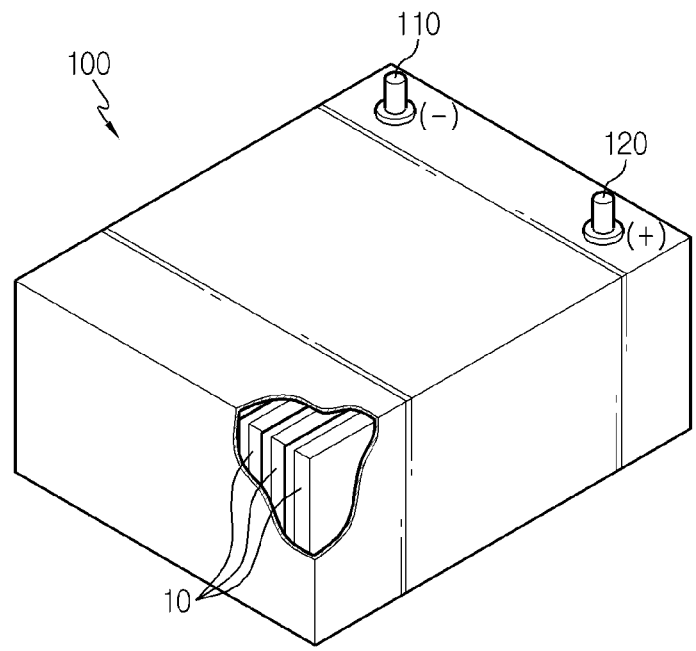
FIG. 2 is a diagram showing a battery pack applied to the battery pack charging system shown in FIG. 1.
Figure 3:
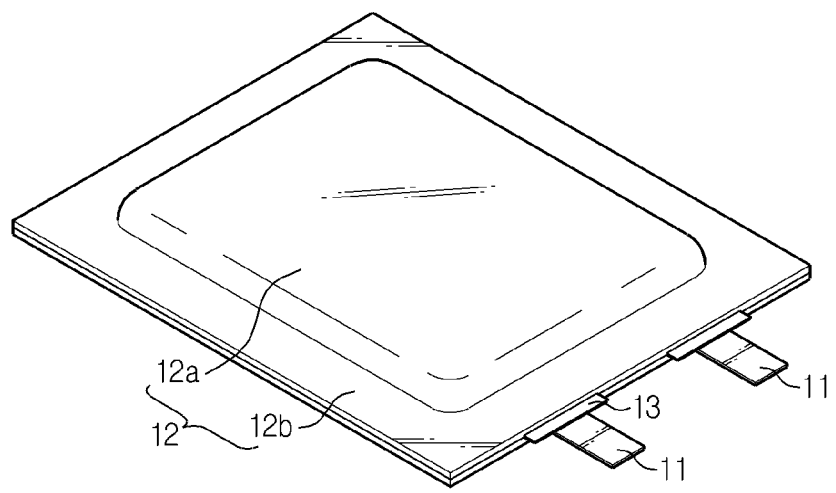
FIG. 3 is a diagram showing an individual battery cell included in the battery pack shown in FIG. 2.
Figure 4:
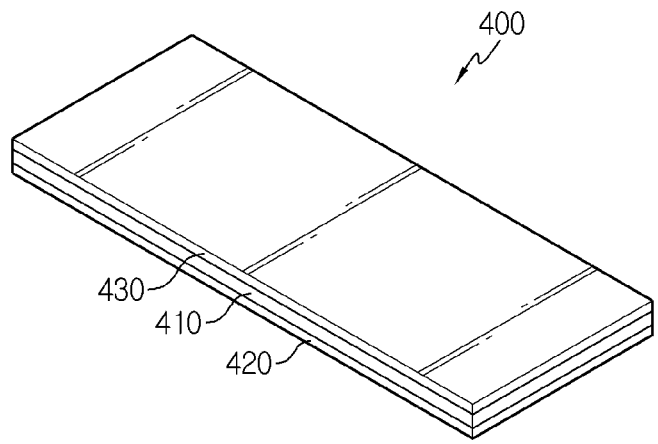
FIG. 4 is a diagram showing a current blocking member applied to the battery pack charging system shown in FIG. 1.
Figure 5:
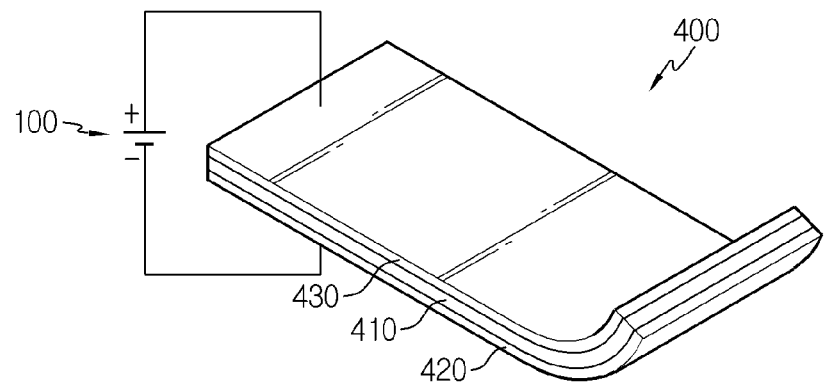
FIG. 5 is a diagram showing a shape deformation of the current blocking member when a potential difference equal to or greater than a reference value is formed between a first metal layer and a second metal layer of the current blocking member shown in FIG. 4.

FIG. 1 is a diagram showing a battery pack charging system according to an embodiment of the present disclosure. FIG. 2 is a diagram showing a battery pack applied to the battery pack charging system shown in FIG. 1. FIG. 3 is a diagram showing an individual battery cell included in the battery pack shown in FIG. 2. Also, FIG. 4 is a diagram showing a current blocking member applied to the battery pack charging system shown in FIG. 1. FIG. 5 is a diagram showing a shape deformation of the current blocking member when a potential difference equal to or greater than a reference value is formed between a first metal layer and a second metal layer of the current blocking member shown in FIG. 4.

First, referring to FIG. 1, the battery pack charging system according to an embodiment of the present disclosure includes a battery pack 100, a charging device 200, a switch 300, and a current blocking member 400.

Referring to FIGS. 1 and 2 together, the battery pack 100 may include a plurality of battery cells 10 connected in series, in parallel, or a mixture of series and parallel. In addition, a cell stack formed by electrically connecting the battery cells 10 may be electrically connected to a negative electrode terminal 110 and a positive electrode terminal 120 that are formed in outside of the battery pack 100.

Referring to FIG. 3, as the battery cell 10 included in the battery pack 100, for example, a pouch type battery cell may be applied. Referring to FIG. 3, the pouch type battery cell 10 may include an electrode assembly (not shown), an electrode lead 11, a cell case 12, and a sealing tape 13.

Although not shown in the drawings, the electrode assembly has a structure in which separators are interposed between positive electrode plates and negative electrode plates that are alternately and repeatedly stacked, and the separators may be positioned on both outermost sides for insulation.

The negative electrode plate includes a negative electrode current collector and a negative electrode active material layer coated on one surface or both surfaces thereof, and at one end thereof, a negative electrode non-coating portion which is not coated with a negative electrode active material is formed and a negative electrode non-coating region functions as a negative electrode tab.

The positive electrode plate includes a positive electrode current collector and a positive electrode active material layer coated on one surface or both surfaces thereof, and at one end thereof, a positive electrode non-coating portion which is not coated with a positive electrode active material is formed and a positive electrode non-coating region functions as a positive electrode tab.

In addition, the separator is interposed between the negative electrode plate and the positive electrode plate to prevent direct contact between the electrode plates having different polarities and may be formed of a porous material to enable the movement of ions by using an electrolyte as a medium between the negative electrode plate and the positive electrode plate.

The electrode lead 11 is connected to the electrode tab and is withdrawn to the outside of the cell case 12. The battery cells 10 adjacent to each other may be electrically connected in series, parallel, or a mixture of series and parallel through the electrode lead 11 to form a single cell stack.

The cell case 12 includes two regions of an accommodation portion 12a that accommodates the electrode assembly and a sealing portion 12b that extends in the circumferential direction of the accommodation portion 12a and is thermally fused in a state where the electrode lead 11 is withdrawn to outside to seal the cell case 12.

Although not shown in the drawings, the cell case 12 is sealed by contacting and thermally fusing edges of an upper case and a lower case configured as a multilayer pouch film in which a resin layer/metal layer/resin layer are sequentially stacked.

The sealing tape 13 is attached to the circumference of the electrode lead 11 and is interposed between the sealing portion 12b of the cell case 12 and the electrode lead 11. The sealing tape 13 is a component applied to prevent the degradation of sealing property of the cell case 12 due to a low adhesion force between the inner surface of the cell case 12 and the electrode lead 11 in a region in which the electrode lead 11 is withdrawn in the sealing portion 12b of the cell case 12.

Referring back to FIG. 1, the charging device 200 is connected to both electrodes of the battery pack 100, that is, the negative electrode terminal 110 and the positive electrode terminal 120 to supply a charging current to the battery pack 100, and may be, for example, an alternator installed in a vehicle to produce power in accordance with the engine driving of the vehicle and to supply the produced power to the battery pack 100.

Referring to FIG. 1, the switch 300 is connected between the negative electrode of the battery pack 100 and the charging device 200 and performs an on/off operation according to a shape deformation of the current blocking member 400 to allow or block the an electrical connection between the battery pack 100 and the charging device 200.

Referring to FIGS. 4 and 5 together with FIG. 1, the current blocking member 400 is electrically connected between both electrodes of the battery pack 100 and is deformed when the voltage of the battery pack 100 is equal to or greater than a reference value to turn off the switch 300.

That is, one side surface of the current blocking member 400 may be mechanically/electrically connected to the switch 300 connected between the negative electrode of the battery pack 100 and the charging device 200, and the other side surface may be electrically connected to the positive electrode of the battery pack 100.

Due to such a connection relationship, when the voltage of the battery pack 100 is applied between both surfaces of the current blocking member 400, and the battery pack 100 is overcharged to have a voltage equal to or greater than a reference value, a potential difference equal to or greater than the reference value is formed between both surfaces of the current blocking member 400 to cause a bending deformation. Meanwhile, when the voltage of the battery pack 100 is within a preset safety range, the switch 300 may remain turned on because the current blocking member 400 maintains its shape without causing the bending deformation.

One side of the current blocking member 400 in the longitudinal direction (meaning downward in FIG. 1) is a fixed end which is directly or indirectly fixed to the battery pack 100 or the ground and does not move. On the other hand, the other side of the current blocking member 400 in the longitudinal direction (meaning upward in FIG. 1) is a free end of which position is changeable when the current blocking member 400 causes the bending deformation.

One surface of the free end is mechanically/electrically connected to the switch 300 by a conductive wiring, and accordingly upon the bending deformation of the current blocking member 400, the free end of the current blocking member 400 moves in a direction away from the switch 300 to turn off the switch 300.

Referring to FIGS. 4 and 5, the specific structure and the principle of shape deformation of the current blocking member 400 applied to the present disclosure will be described.

Referring to FIGS. 4 and 5, as described above, in order to be able to block an overcurrent due to the shape deformation according to a potential difference formed between both surfaces, the current blocking member 400 may include an electro active polymer (EAP) layer 410, a first metal layer 420 formed on one side surface of the EAP layer 410, and a second metal layer 430 formed on the other side surface of the EAP layer 410.

The EAP layer 410, i.e., the electroactive polymer layer, corresponds to a layer formed of a polymer electrolyte having an excellent ion transfer property, and may include at least one polymer electrolyte selected from, for example, Nafion, polypyrrole, polyaniline, and polythiophene.

The first metal layer 420 and the second metal layer 430 are formed on both surfaces of the EAP layer 410 and may be formed of a metal having excellent electrical conductivity. The metal layers 420 and 430 may include at least one metal selected from, for example, platinum (Pt), gold (Au), silver (Ag), and copper (Cu).

The current blocking member 400 causes the shape deformation when voltage equal to or greater than a reference value is applied through the metal layers 410 and 420 formed on both surfaces of the EAP layer 410.

That is, the first metal layer 420 is electrically connected to the negative electrode of the battery pack 100, and the second metal layer 430 is electrically connected to the positive electrode of the battery pack 100 such that a potential difference corresponding to the voltage of the battery pack 100 is formed between the pair of metal layers 420 and 430.

When the potential difference formed between the pair of metal layers 420 and 430 as described above reaches a large numerical value exceeding a safety range considering the specification of the battery pack 100, mobility cations present inside the polymer electrolyte forming the EAP layer 410 move in the direction of the negatively charged first metal layer 420 while hydrated in water. In this case, an osmotic pressure is caused by an imbalance in the ion concentration between the first metal layer 420 and the second metal layer 430, which increases an amount of water molecules toward the negatively charged first metal layer 420, and thus the bending deformation occurs in the current blocking member 400 in the direction toward the second metal layer 430.

For such a shape deformation of the current blocking member 400 and a resulting operation of the switch 300, the first metal layer 420 is electrically/mechanically connected to the switch 300.

Meanwhile, the magnitude of the voltage that may cause the shape deformation of the current blocking member 400 varies depending on the type of the polymer electrolyte constituting the EAP layer 410 applied to the current blocking member 400.

That is, the reference value of the voltage mentioned in the present specification may vary according to the type of the polymer electrolyte applied, and accordingly, a suitable polymer electrolyte may be selected according to the safety voltage range of the battery pack 100 constituting the battery pack charging system to which the current blocking member 400 is applied, thereby quickly blocking the current when an event such as overcharging of the battery pack 100 occurs.

Next, a modification of the connection relationship of the current blocking member 400 and the switch 300 shown in FIG. 1 will be described with reference to FIG. 6.

Figure 6:
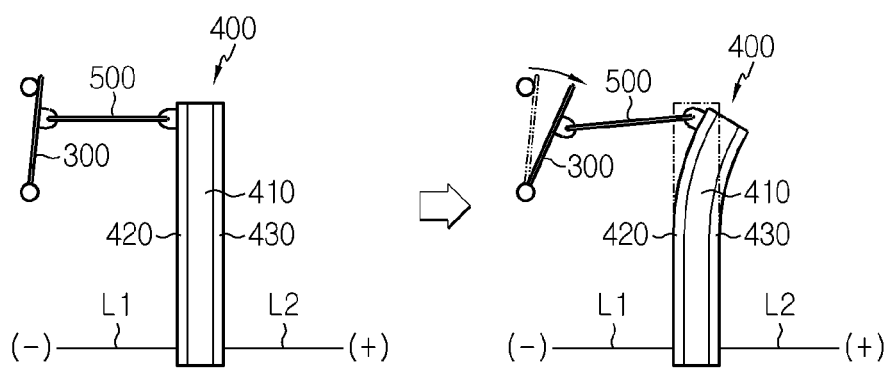
FIG. 6 is a diagram showing a modification of the connection relationship of a current blocking member and a switch shown in FIG. 1.

FIG. 6 is a diagram showing a modification of the connection relationship of the current blocking member 400 and the switch 300 shown in FIG. 1.

Referring to FIG. 6, unlike that a free end of the switch 300 and the current blocking member 400 is mechanically/electrically connected by one conductive wiring simultaneously as described in the previous embodiment shown in FIG. 1, a mechanical connection between the switch 300 and the current blocking member 400 is performed by a connecting rod 500, and an electrical connection therebetween is performed by a separate connecting lead L1.

Although the connection between the switch 300 and the first metal layer 420 of the current blocking member 400 is performed by one conductive wiring, the first metal layer 420 may be negatively charged and according to a shape deformation of the current blocking member 400, the switch 300 may move together.

However, when the free end moves in the direction toward the second metal layer 430 due to the bending deformation of the current blocking member 400, a hinge coupling structure may be applied to coupling between the current blocking member 400 and the switch 300 in order to smoothly move the switch 300.

However, when the hinge coupling structure is applied, the stability of the electrical connection may deteriorate at a connection portion of the conductive wiring and the switch 300 and a connection portion of the conductive wiring and the first metal layer 420. Therefore, the mechanical connection and the electrical connection between the switch 300 and the current blocking member 400 may be separately performed by using two members rather than simultaneously performed by using one member.

In this regard, the battery pack charging system shown in FIG. 6 may include the connecting rod 500 hinged to the switch 300 and the first metal layer 420 and the negative electrode connecting lead L1 electrically connecting the first metal layer 420 and the negative electrode of the battery pack 100. In this case, the second metal layer 430 needs to be electrically connected to the positive electrode of the battery pack 100, and for the electrical connection between the second metal layer 430 and the positive electrode of the battery pack 100, a positive electrode connecting lead L2 may be applied.

As described above, the battery pack charging system according to the present disclosure is configured to perform an on/off operation of the switch 300 that electrically connects between the battery pack 100 and the charging device 200 by using the current blocking member 400 that causes the bending deformation according to the voltage of the battery pack 100, thereby securing safety in the use of the battery pack 100.

Figure 7:
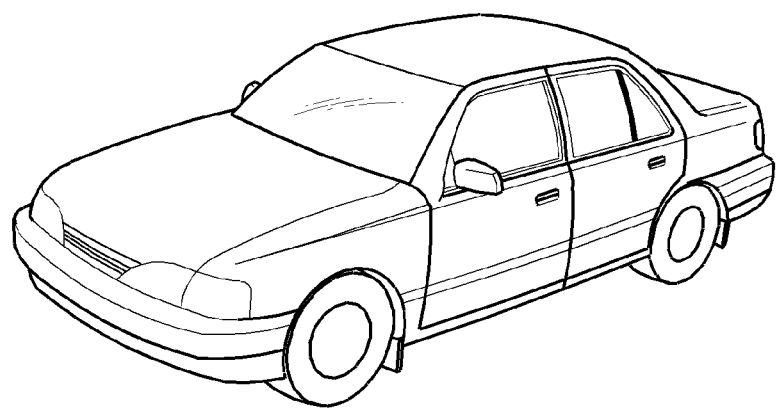
FIG. 7 is a diagram showing a vehicle according to an embodiment of the present disclosure.

Meanwhile, a vehicle according to an embodiment of the present disclosure shown in FIG. 7 includes the battery pack charging system according to the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack charging system comprising:
   a battery pack comprising a plurality of battery cells and a pair of electrodes;
   a charging device connected to both electrodes of the battery pack and configured to supply a charging current to the battery pack;
   a switch connected between the battery pack and the charging device and configured to allow or block a flow of the charging current; and
   a current blocking member mechanically connected to the switch and configured to turn off the switch by causing a bending deformation when a potential difference formed between both electrodes of the battery pack is equal to or greater than a reference value.

2. The battery pack charging system of claim 1, wherein each of the plurality of battery cells is a pouch type battery cell.

3. The battery pack charging system of claim 1, wherein the charging device is an alternator installed in a vehicle.

4. A vehicle comprising a battery pack charging system according to claim 1.

5. The battery pack charging system of claim 1, wherein the current blocking member comprises:
   an electro active polymer (EAP) layer;
   a first metal layer on a first side surface of the EAP layer; and
   a second metal layer on a second side surface of the EAP layer.

6. The battery pack charging system of claim 1, wherein the current blocking member is between the battery pack and the charging device.

7. The battery pack charging system of claim 1, wherein the switch is connected between the negative electrode of the battery pack and the charging device.

8. The battery pack charging system of claim 1, wherein the current blocking member is connected to the switch by a connecting rod.

9. The battery pack charging system of claim 1, wherein the current blocking member can open and close the switch based on the bending deformation of the current blocking member.

10. A battery pack charging system comprising:
    a battery pack comprising a plurality of battery cells and a pair of electrodes;
    a charging device connected to both electrodes of the battery pack and configured to supply a charging current to the battery pack;
    a switch connected between the battery pack and the charging device and configured to allow or block a flow of the charging current; and
    a current blocking member mechanically connected to the switch and configured to turn off the switch by causing a bending deformation when a potential difference formed between both electrodes of the battery pack is equal to or greater than a reference value,
    wherein a first end of the current blocking member in a longitudinal direction is directly or indirectly fixed to the battery pack or a ground, and
    wherein a second end of the current blocking member is a free end having a position which is changeable by the bending deformation.

11. The battery pack charging system of claim 10, wherein the current blocking member comprises:
    an electro active polymer (EAP) layer;
    a first metal layer formed on one side surface of the EAP layer; and
    a second metal layer formed on the other side surface of the EAP layer.

12. The battery pack of charging system claim 11, wherein the EAP layer comprises at least one polymer electrolyte selected from the group consisting of Nafion, polypyrrole, polyaniline and polythiophene.

13. The battery pack charging system of claim 11, wherein the first metal layer and the second metal layer comprise a metal selected from the group comprising platinum, silver, and copper.

14. The battery pack charging system of claim 11, wherein the first metal layer is electrically connected to a negative electrode of the battery pack, and
    wherein the second metal layer is electrically connected to a positive electrode of the battery pack.

15. The battery pack charging system of claim 14, wherein the switch is connected between the negative electrode of the battery pack and the charging device.

16. The battery pack charging system of claim 15, wherein the first metal layer is mechanically/electrically connected to the switch by a connecting rod formed of a conductive material.

17. The battery pack charging system of claim 15, wherein the first metal layer is mechanically connected to the switch by a connecting rod and is electrically connected to the negative electrode of the battery pack by a negative electrode connecting lead.

18. The battery pack charging system of claim 17, wherein the connecting rod is hinged to each of the switch and the first metal layer.

\* \* \* \* \*